Dec. 4, 1928.

R. W. RIDER 1,694,232

TIRE DEFLATION SIGNAL DEVICE

Original Filed Sept. 16, 1926

INVENTOR.

Rowland W. Rider

BY A. F. Greeley

ATTORNEY.

Patented Dec. 4, 1928.

1,694,232

UNITED STATES PATENT OFFICE.

ROWLAND W. RIDER, OF SALT LAKE CITY, UTAH, ASSIGNOR TO UTAH ROYALTY CORPORATION.

TIRE-DEFLATION SIGNAL DEVICE.

Application filed September 16, 1926, Serial No. 135,950. Renewed June 6, 1928.

My invention relates to tire deflation signals, that is, devices for use on pneumatic tires, such as are used on automobiles, which are intended to indicate by audible signal when a tire becomes materially deflated by reason of escape of air from the inner tube, and my invention has for its object to provide a device for this purpose which may be readily placed in position without cutting or baring or doing anything else to change or modify the tire parts or rim, and which will be simple and inexpensive in construction and efficient for its purpose.

With these objects and other objects hereinafter explained in view my invention consists in the construction and combination of elements hereinafter explained and particularly pointed out in the claims.

Referring to the drawings.

Figure 1:
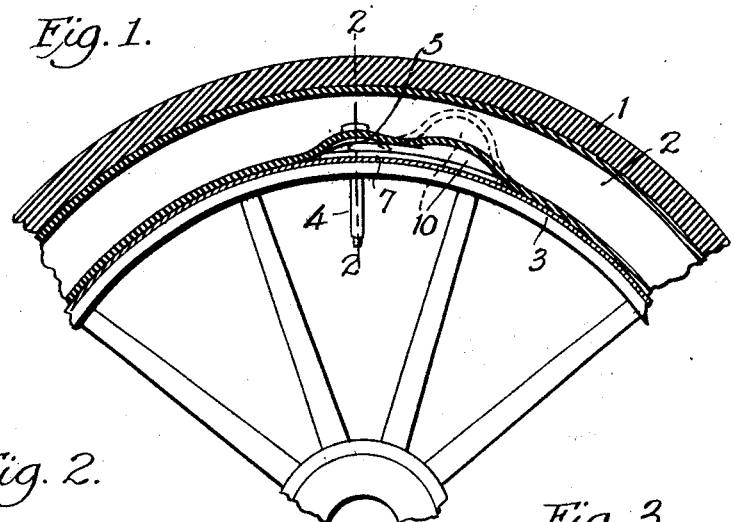
Figure 1 is a side view of a portion of an automobile wheel with pneumatic tire having the device of my invention applied to it.
Figure 2:
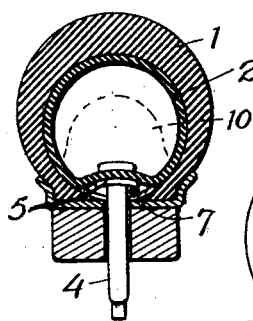
Figure 2 is a cross sectional view on line 2—2 of Figure 1.
Figure 3:
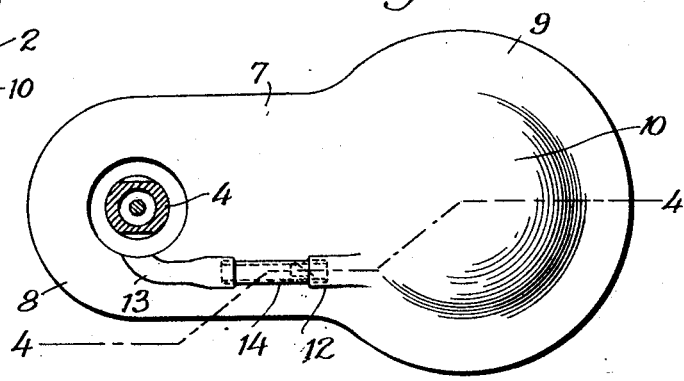
Figure 3 is a plan view of a device embodying my invention.
Figure 4:
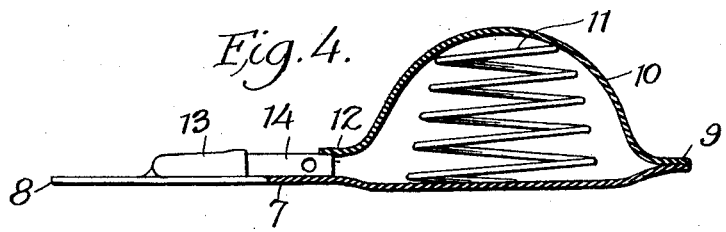
Figure 4 is a longitudinal sectional view of the device shown in Figure 3.

In the drawings 1 indicates a balloon or other automobile tire casing, 2 indicates the inner tube and 3 indicates the felly. The inner tube 2 carries the usual valve stem 4 which extends through a suitable opening in the felly, the valve stem having the flange 5 at its inner end and being secured to the inner tube. The parts thus described form no part of my invention and may be of any usual form or construction.

My device for signalling that air has escaped from the inner tube to such an extent that the tire is underinflated comprises a base plate 7 having an enlargement 8 at an end with a central opening adapted to fit over the valve stem 4 and having at its other end an enlargement 9 slightly cupped and of sufficient diameter to extend well across the inner tube when in position. The plate 7 with its enlargements 8 and 9 is preferably formed of semi-hard rubber, that is, rubber which has been vulcanized sufficiently to keep its form under ordinary circumstances but to yield slightly without breaking under unusual pressure. To the edges of the cupped enlargement 9 are secured the edges of an inverted cup 10 formed of fabric coated with relatively soft rubber. Between the cupped enlargement 9 and the inner face of the inverted cup 10 is arranged a coiled spring 11 of such strength that if the device is not subjected to compression, the inverted cup will be held away from the enlargement 9. A tube 12 extends along the enlargement plate 7 between the enlargements 8 and 9, having one end opening into the cupped enlargement 9 and the other end bent at 13 and opening into the opening in enlargement 9 in which the valve tube 4 is received.

At any convenient point in the tube 12 is arranged a whistle 14 or other device adapted to be operated by the passage of air through the tube to give an audible signal.

In order to put my device in position the enlargement 8 is slipped over the valve stem 4 and the enlargement 9 is placed against the inner tube between it and the inner edges of the tire casing. When the inner tube is inflated to the pressure desired it presses the inverted cup 10 toward the cupped enlargement 9 compressing the coiled spring 11. So long as the air in the inner tube is maintained at or near the desired pressure the inverted cup will be held in this collapsed position and no air will pass through tube 12 to operate the whistle or other signal device. But if the air leaks from the inner tube from any cause so that the tire becomes practically deflated the spring 11 will force the inverted cup away from the enlargement 9 and will cause the air to be drawn in through tube 12. As the wheel continues to rotate, the tire being practically deflated, every time the portion of the wheel opposite the valve tube is pressed against the ground the inverted cup will be pressed inward against the face of the spring 11 forcing air outward through tube 12 and operating the whistle or other signal and every time the portion opposite the valve tube reaches its highest position it will relieve the pressure and permit the spring to expand the inverted cup thus drawing air inward through the tube 12 and causing the whistle or other signal to sound. If the automobile is driven rapidly the succession of sounds thus produced will be such that the driver will be quickly made aware of the necessity of pumping up the tube.

My device may be placed in position without any change in the construction of any part of the tire or the felly and will be held in position by the extension 8 fitting over the valve tube.

While the plate 7 with its extensions 8 and 9 is preferably formed of rubber it may be of metal. The inverted cup 10 is preferably formed of rubber coated fabric but may be of any flexible material impervious to air.

Instead of a whistle a squawking or honking device may be used, it being essential only that the device used be capable of producing a signal loud enough to attract the attention of the driver.

The cupped enlargement 8 with the inverted cup 10 forms an air bulb which is expanded by the spring 10 when not held in compressed condition by the pressure of the inner tube. So long as the inner tube is inflated to normal pressure the bulb will be held compressed. When the inner tube is deflated the bulb will be expanded by the spring and as the wheel rolls the bulb will be alternately compressed and permitted to expand.

Having thus described my invention what I claim is:

1. A tire deflation signal device for use in connection with a pneumatic tire adapted to be inserted between the inner tube and the tire casing comprising a plate having an expansible bulb at one end adapted to be held in compressed condition by the inflated inner tube, an audible signal adapted to be operated by passage of air to or from the bulb, and means carried by the plate for engaging the valve stem to hold the plate in position.

2. A tire deflation signal device for use in connection with a pneumatic tire comprising a plate adapted to be inserted between the inner tube and the tire casing having at one end a cupped enlargement, an inverted cup secured to said enlargement, a spring between the cupped enlargement and the interior of the inverted cup, an enlargement at the other end of the plate having an opening therein to fit over the valve stem, a tube leading from the cupped enlargement to the opening in the enlargement at the other end of the plate and a signal device adapted to be operated by passage of air through the tube.

In testimony whereof, I hereunto affix my signature.

ROWLAND W. RIDER.